June 17, 1952

W. T. STEPHENS 2,600,702

CONTROL VALVE

Filed Nov. 29, 1945

INVENTOR.
WILLIAM T. STEPHENS
BY Frederic B. Schramm
ATTORNEY

Patented June 17, 1952

2,600,702

UNITED STATES PATENT OFFICE 2,600,702

CONTROL VALVE

William T. Stephens, Painesville, Ohio

Application November 29, 1945, Serial No. 631,587

4 Claims. (Cl. 277—55)

My invention relates to valves for the control of fluid flow and concerns, particularly, valves of the sliding-piston type.

A further object of my invention is to provide a control valve in which a cushioning action is obtained so as to avoid water hammer, vibration, or wear on the parts of the system.

A further object of my invention is to provide a fluid control valve in which a retarding-action check valve is incorporated.

A further object of my invention is to provide a control valve having a damped relief valve incorporated therein. Still another object of my invention is to provide a relief valve with means for preventing chattering or vibration.

Still another object of my invention is to provide a control valve adapted for controlling the admission of fluid to a plurality of outgoing lines or hydraulic operators independently of each other and adapted for controlling either single-acting or double-acting hydraulic operators.

Other and further objects, features and advantages of my invention will become apparent as the description proceeds.

In carrying out my invention, in accordance with a preferred form thereof, I provide a suitable valve block or housing composed of a metal casting such as cast iron, for example, with through bores for pistons having portions of different diameter and passageways communicating with the bores whereby the direction of flow of oil admitted to the valve housing may be varied or controlled by varying the axial positions of the pistons in the bores with respect to the locations of the passageways communicating with the bores. In order to retard back flow of oil from one passage to another through a portion of the bore, loosely mounted discs or cones acting as check valve members are provided which are free to move in one direction only against a biasing spring. For cushioning the action of the pistons, crescents are milled in the edges of larger diameter portions of each piston so that communication from one of the passageways to a portion of the bore is closed gradually as the larger diameter portion of the piston closes upon the bore.

Figure 1:
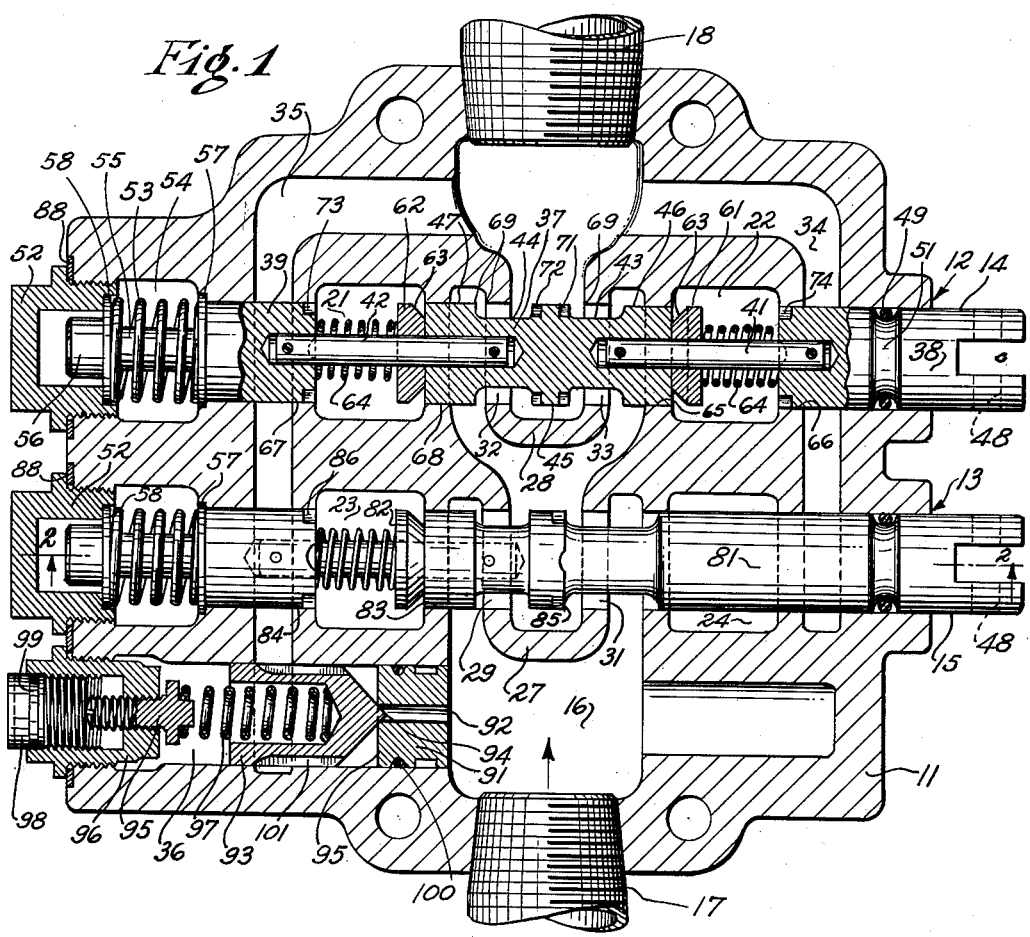
Figure 2:
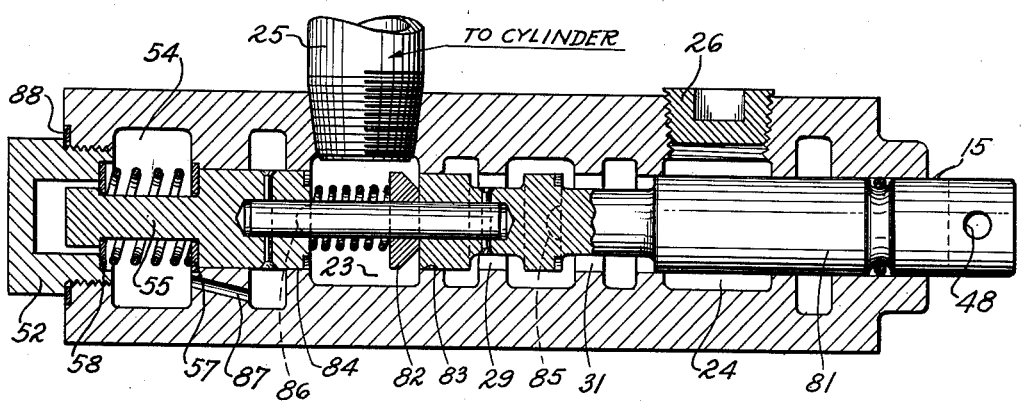

A better understanding of the invention will be afforded by the following detailed description considered in conjunction with the accompanying drawing in which Fig. 1 is a sectional view represented as cut by a plane passing through the axes of a plurality of the pistons of the valve, and Fig. 2 is a cross-sectional view represented as cut by a plane transverse to the plane of Fig. 1 passing through the axis of one of the sliding pistons.

Like reference characters are utilized throughout the drawing to designate like parts.

For the sake of illustration, I have shown and described fluid-flow control mechanism employing two valve pistons, one for controlling a single-acting cylinder and the other for controlling admission and discharge of fluid from a double-acting cylinder. My invention is not, however, limited to the precise arrangement illustrated and described, and the invention is adapted for the control of fluid in any number of lines, either single-acting or double-acting.

The embodiment of my invention illustrated in the drawings comprises a valve block, housing, or casing 11 composed of suitable material, preferably metal such as cast iron or brass having a plurality of bores 12 and 13 for containing pistons 14 and 15 and having various internal passageways, to be described more in detail hereinafter, intersecting the bores 12 and 13 and having openings for connections to various oil-supplying and receiving lines or tubes. There is a main transverse passageway 16 connected at one end to an inlet tube 17 and at the other end to an outlet tube 18. The inlet tube 17 is connected to a suitable source of fluid pressure such as the output line of an oil pump, and the outlet tube 18 is connected to a suitable outlet line such as a return line of a pump or the sump.

Each of the piston bores has two enlarged portions or chambers adapted to be connected by tubing to the two ends of a hydraulic cylinder to be operated by the fluid controlled by the movement of the valve piston. For example, the bore 12 for the piston 14 has chambers 21 and 22, each adapted to be connected by tubing, not shown, to the two ends of a control cylinder or other apparatus to be controlled by the valve action of the piston 14. Similarly, the bore 13 for the piston 15 has two chambers 23 and 24, the chamber 23 being connected to a tube 25 adapted to be connected to one end of a single-acting hydraulic operator cylinder. Since the piston 13 is intended for the control of a single-acting cylinder, the outlet from the chamber 24 is closed by a screw plug 26 instead of being connected to a second tube such as the tube 25. Nevertheless, the construction of the bore 13 is the same as indicated for control of a double-acting cylinder in that a length of tubing could be connected in place of the plug 26.

Webs or closure walls are formed in the casing 11 across the passageway 16 in such a manner that the passageway may be closed or fluid flow may be diverted to or from the chambers 21, 22, 23 and 24. These walls take the form of what may be called "folded webs" 27 and 28, each of which would close the passageway 16 except for the openings through which the pistons 14 and 15 pass. The folded web 27 has two openings 29 and 31 forming portions of the bore 13 for the piston 15, and the folded web 28 has two openings 32 and 33 forming portions of the bore 12 for the piston 14.

Two bleed or discharge passageways 34 and 35 branching from the outlet end of the main passageway 16 are also provided, each of which is also intersected by both of the bores 12 and 13 for the pistons 14 and 15 respectively. A passageway 36 or bore is also provided for a relief valve communicating with the inlet end of the main passageway 16 as will be described in further detail hereinafter. Each of the piston-receiving bores 12 and 13 preferably passes entirely through the casing 11 longitudinally in order to facilitate accurate machining and surface finishing of the bores as by means of honing or the like.

Although my invention is not limited thereto, preferably for the sake of increased convenience in manufacturing and assembling, the pistons 14 and 15 are assembled from separately fabricated parts. Each of the reference numerals 14 and 15 is used to indicate a unitary assembly of parts moving together to form a unitary member or piston. The piston 14 for a double-acting valve comprises a center-part 37 which is symmetrical end for end, an outer end part 38, an inner end part 39, a stem 41 joining the parts 37 and 38, and a stem 42 joining the parts 37 and 39. The stems 41 and 42 are coaxial with the remainder of the piston 14 and are set into the adjacent parts being pinned or otherwise secured thereto to form a unitary piston. The center-part 37 has two smaller diameter neck portions 43 and 44 between a central larger diameter portion 45 fitting the diameter of the bore 12 and two larger diameter end portions 46 and 47 also fitting the diameter of the bore 12.

The end portion 38 is bifurcated at the end and has a crosswise opening 48 for receiving a pin, not shown, to enable the piston 38 to be connected to an operating link and a lever or handle, not shown. The parts 38 and 39 are also of such a diameter as to fit the diameter of the bore 12 and, preferably, the part 38 is provided with a suitable sealing means such as a resilient gasket 49 fitting in an annular groove or an O-ring seal or the like.

Preferably, the inner end of the bore 12, that is the end away from the bifurcated end of the piston 12, has a hollow closure cap 52 threaded therein. In order to retain the piston 13, normally in the center or in a neutral position in which it is illustrated in Fig. 1, a biasing compression spring 53 is provided in a chamber 54, forming an enlargement of the bore 12, and the part 39 is provided with a stem 55 having a head 56. Washers 57 and 58, loosely mounted upon the stem 55, are provided at either end of the stem 55. They are of sufficient diameter to have the ends of the biasing compression spring 53 bear against them and also of sufficient diameter to fit against shoulders or abutments formed around the portion of the bore 12 and the portion of the screw cap 52 at either end of the chamber 54. Consequently, motion of the piston 14 in either direction from the neutral position, illustrated, compresses the spring 53 by pressing it against one of the washers 57 or 58 by the motion of the other washer, thus setting up a force for restoring the piston 14 to its neutral position.

In order to prevent return of oil back through the inlet tube 17 in case of loss of pressure when one of the valves is in such a position as to admit fluid to one of the chambers 21, 22, or 23, check valve elements 61 and 62 are provided which are loosely mounted upon the stems 41 and 42 respectively. The check valve elements 61 and 62 may be in the form of discs or, preferably, have conical or tapered surfaces 63 adjacent the central end of the piston 14 in order to facilitate flow of oil in the desired direction. Preferably, biasing springs 64 are provided for normally holding the valve elements 61 and 62 against the end surfaces of the center-part 37 of the piston 14.

The dimensions are such that when the piston 14 is in its central or neutral position, both passageways 32 and 33 of the bore 12 are open to admit fluid through the passageway 16 from the inlet 17 to the outlet 18 and on to any other bores, not shown, which may be interposed between the bore 12 and the outlet tube 18. In this position, the chambers 21 and 22, adapted to be connected to both ends of a cylinder to be operated, are also closed at both ends where they intersect the bore 12 and, likewise, the discharge vents 34 and 35 are closed where they intersect the bore 12.

The dimensions are also such that when the piston 14 is moved fully to the left, the large diameter portion 45 occupies the portion 32 of the bore so as to close this opening, the portion 46 occupies the portion 33 of the bore 12 so as to close this opening, the portion 46 leaves the portion 65 of the bore 12 so as to admit fluid pressure through opening 65 into the chamber 22, the portion 66 of the bore 12 remains closed by the larger diameter portion 38 of the piston 14, and the larger diameter portion 39 of the piston 14 leaves the portion 67 of the bore 12 so as to open this portion of the opening. The axial length of the larger diameter portion 47 of the piston 14 is also such that when the piston is moved fully to the left, the portion 47 of the piston remains in the portion 68 of the bore so that this opening continues to be closed.

The check valve member 61 is also moved into the opening 65. However, owing to the resiliency of the spring 64, pressure admitted from the passageway 16 presses the check valve member 16 back against the spring 64 and permits oil to flow into the chamber 22 and thence into one end of the hydraulic operating cylinder, not shown. Since the other end of the hydraulic operating cylinder is connected to the chamber 21, the oil at that end of the operating cylinder is released or discharged through the opening 67 into the branch passageway 35 and out to the sump tube 18. As soon as the force acting longitudinally upon the piston 14 is relieved, the spring 53 returns it to the neutral position, and the hydraulic operating cylinder operated by the fluid pressure is held in the position which it has attained since both ends of the cylinder are closed by the closure of the chambers 21 and 22. If, however, the piston 14 is moved fully in the opposite direction, the opposite action takes place. An opening is formed from the chamber 22 into the branch discharge opening 34, and an opening is formed from the passageway 16 through the opening 68 to the chamber 21.

In order to cushion the forces acting when the flow of oil is first cut off or diverted by movement of the piston 38, crescents are preferably milled out of the edges of certain portions of the piston or the corresponding surfaces in the bore 12. The closing of the passageways 32 and 33 as the piston 14 is moved to the right to the point at which the enlarged portion of the piston enter the opening 32 and 33 may be cushioned by relieving one of the edges 69 in the enlarged portion 47 or in the casing 11 around the bore. Preferably, however, a plurality of crescent-shaped openings or slots, for example, four openings 71 are milled in the right-hand edge of the larger diameter portion 45 of the piston 14. In order to make the cutting off of the pressure still more gradual, preferably one pair of slots 71 is made slightly deeper axially than the other pair of milled slots. Similar milled slots 72 are provided to cushion the action when the piston 14 is moved in the opposite direction. Slots 73 and 74 having the same purpose are provided for cushioning the stoppage of fluid discharging into the passageways 34 or 35 through chambers 21 or 22 from the discharge end of the hydraulic operator piston being controlled, when the piston 14 is returned to its neutral position.

The diameter of the check valve member 61 is slightly less than the diameter of the bore portion 65, likewise, the diameter of check valve member 62 is slightly less than the diameter of the portion 68 of the bore 12 in order to serve more as a retarding check valve than as an absolute closing check valve.

The parts of the piston 14 and the parts of the mechanism associated therewith have been described in considerable detail and need not be described in connection with other pistons for controlling double-acting operators since any desired number of similar pistons and bores may be employed for controlling the flow to and return of oil from additional pairs of chambers similar to the chambers 21 and 22.

Where the control valve mechanism includes a plurality of pistons, each for producing double-acting valve action, the remaining pistons and associated parts may be like those described in detail in connection with the piston 14. In the case of pistons such as the piston 15 for producing control of a single-acting cylinder, certain duplicated parts of the piston assembly described in connection with the piston 14 may be omitted. Thus, if the chamber 23 is plugged, the parts corresponding to the central part 37, the end part 39, and the connecting stem 42 of the piston 14 may be made in integral, and the check valve elements corresponding to the disc 62 and the spring 64 may be omitted; conversely, if the chamber 24 is plugged and the chamber 23 is connected to a tube such as the tube 25. In arrangement illustrated, the chamber 24 is plugged and, accordingly, an integral part 65 may be provided which is one piece from the bifurcated end to the portion abutting the loosely mounted check valve element 82.

The piston 15 is drawn to the right to close the passageways 29 and 31 and admit fluid through a portion 83 of the bore to the chamber 23 which is connected to a tube 25 communicating with a cylinder to be controlled. The piston 15 is pushed to the left for opening the portion 84 of the bore 13 to permit fluid from the chamber 23 to discharge into the branch passageway 35 leading to the sump tube 18. Since the piston 15 is used for controlling a single-acting cylinder and does not control admission of fluid pressure to two different fluid chambers, one set of the cushioning slots or crescents illustrated in connection with the piston 14 may be omitted. As illustrated, only cushioning slots 85 and 86 are provided.

In order to avoid trapping of oil or other fluid in the chamber 54, vents 87 (see Fig. 2) are preferably provided to the discharge or branch passageway 35, and gaskets 88 are provided for preventing leakage under the heads of the closure cap 52.

The relief valve in the overload passageway 36 comprises a plug 91 fitted into the passageway 36 having a relatively small bore 92, a movable relief valve member 93 having a conical tip or a valve face 94 adapted to fit into the opening 92 against a seat 95 formed at the end of the opening 92, an adjusting screw 95 threaded into a gasketed screw cap 96, and a biasing spring 97. Preferably a screw plug 98 having an O-ring seal 99 is provided for stopping leakage of any fluid which may seep around the threads of the adjusting screw 95. The plug 91 is secured in the bore 36 in any suitable manner as by means of an expanding oil-absorbent natural rubber ring 100 such as described in my copending application 606,866, now Patent No. 2,533,531 issued December 12, 1950. The check valve member 93 is provided with milled grooves or flats 101 along the surfaces thereof extending axially so that as soon as the pressure in the passageway 16 becomes so great as to lift the member 93 from the seat 95, the pressure may be relieved through the opening 92 and the milled passageways or grooves or flats 101 into the discharge branch passageway 35. It will be observed that the length of the longitudinal grooves or flats 101 is such as to extend from the right-hand end of the member 93 to the left-hand edge of the passageway 35. The dimensions are also such that in case the pressure in the passageway 16 becomes greatly excessive, the member 93 is moved so far to the left against the pressure of the spring 97 that the full diameter portion of the member 93 clears the passageway 35 so as to permit rapid discharge of fluid from the passageway 16.

The diameter of the member 93 is such as to form a sliding fit with small clearance in the bore 36 so that oil is trapped in the portion of the passageway 26 between the member 93 and the cap 96, and retards movement of the member 93. Consequently, the member 93 is prevented from moving rapidly in either direction so that chattering and hunting are avoided.

While I described my invention as embodied in concrete form and as operating in a specific manner in accordance with the provisions of the Patent Statutes, it should be understood that I do not limit my invention thereto since various modifications will suggest themselves to those skilled in the art without departing from the spirit of the invention the scope of which is set forth in the annexed claims.

What I claim is:

1. A valve comprising a housing, a piston receiving bore therein, said housing having formed therein a fluid outlet chamber having spaced walls intersected by the bore, said bore including a first pair of enlargements with one disclosed at each side of said walls, a fluid inlet passageway in communication with said first pair of enlargements, said bore having a second pair of enlargements adapted for connection with work cylinder means with one of said second pair of enlargements disposed at each side of said first pair of enlargements, there being a wall between adjacent enlargements, a piston in said bore, said piston when in neutral position having a pair of lands each fitting in the wall between adjacent enlargements and a central land disposed between the spaced walls of said outlet chamber, the dimensions and spacing of said lands, enlargements, and walls being such that movement of said piston in one direction from neutral causes one of said pair of lands to withdraw from the associated wall between the enlargements to connect the adjacent enlargements said one land entering the bore through the adjacent outlet chamber wall, said central land simultaneously entering the bore through the other of said outlet chamber walls whereby said outlet chamber is blocked from the inlet passageway, the other of said pair of lands remaining in the bore in its associated wall between the other enlargements, and a disc-like check valve resiliently biased against the end of said piston outwardly of said one of said pair of lands, said check valve being drawn into the bore in the adjacent wall between the enlargements when said piston is moved in said one direction, said check valve being of substantially the same diameter as the bore in said last-named wall.

2. A valve comprising in combination a housing having a bore therein, an inlet chamber in said housing, an enlarged chamber in said housing adjacent said inlet passageway for connection to work cylinder means, a wall between said chambers intersected by said bore, a piston slidable in said bore having a portion fitting the bore at said wall to block communication between said chambers, a check valve disc in said enlarged chamber and resiliently biased toward the end of said piston portion, movement of the piston in one direction withdrawing said piston portion from said wall and opening a passageway from said inlet into said enlarged chamber, said motion also drawing said check valve into the bore in said wall, said check valve being of substantially the same diameter as said last-named bore to impede communication through the bore, the existence of sufficient pressure in said inlet chamber forcing said check valve disc back out of the bore in said wall.

3. A valve comprising in combination a housing having a bore therein, an inlet chamber in said housing, an enlarged chamber in said housing adjacent said inlet passageway for connection to work cylinder means, a wall between said chambers intersected by said bore, an outlet chamber adjacent said enlarged chamber, a second wall between said latter chambers intersected by said bore, a piston slidable in said bore having two head portions each fitting the bore at said walls to block communication between said chambers, said piston having a stem extending between the head portions and disposed in said enlarged chamber, said stem carrying a check valve disc resiliently biased against the end of the head portion disposed in said first wall, movement of the piston in one direction withdrawing the piston portion engaged by the check valve from said wall and opening a passageway from said inlet into said enlarged chamber, said motion also drawing said check valve into the bore in said first wall, said check valve being of substantially the same diameter as said last-named bore to impede communication through the bore, the existence of sufficient pressure in said inlet chamber forcing said check valve disc back out of the bore in said wall.

4. A valve comprising in combination a housing having a bore therein, an inlet chamber in said housing, an enlarged chamber in said housing adjacent said inlet passageway for connection to work cylinder means, a wall between said chambers intersected by said bore, a piston slidable in said bore having a portion fitting the bore at said wall to block communication between said chambers, a check valve disc in said enlarged chamber and resiliently biased toward the end of said piston portion, said check valve being of substantially the same diameter as said last-named bore, said check valve being formed to provide a slight clearance for fluid leakage between the valve and bore, movement of the piston in one direction withdrawing said piston portion from said wall and opening a passageway from said inlet into said enlarged chamber, said motion also drawing said check valve into the bore in said wall to impede communication through the bore, the existence of sufficient pressure in said inlet chamber forcing said check valve due to said clearance disc back out of the bore in said wall, said check valve being arranged so that it does not completely block communication between said inlet and enlarged chambers to retard return flow through said bore upon loss of inlet pressure without sealing the bore.

WILLIAM T. STEPHENS.

REFERENCES CITED

The following references are of record in the file of this patent:

UNITED STATES PATENTS

| Number | Name | Date |
|---|---|---|
| 1,158,321 | Shipley | Oct. 26, 1915 |
| 1,879,020 | Balsiger | Sept. 27, 1932 |
| 2,247,140 | Twyman | June 24, 1941 |
| 2,289,567 | Berglund | July 14, 1942 |
| 2,299,540 | Hartline | Oct. 20, 1942 |
| 2,321,000 | Bennett | June 8, 1943 |
| 2,322,139 | Kaelin | June 15, 1943 |
| 2,362,944 | Stephens | Nov. 14, 1944 |